May 29, 1962 T. N. LOWRY 3,037,085

ELECTRICALLY CONTROLLED SWITCHING DEVICE

Filed Oct. 22, 1959 3 Sheets-Sheet 1

INVENTOR
T. N. LOWRY
BY
ATTORNEY

May 29, 1962 T. N. LOWRY 3,037,085

ELECTRICALLY CONTROLLED SWITCHING DEVICE

Filed Oct. 22, 1959 3 Sheets-Sheet 2

INVENTOR
T. N. LOWRY
BY Henry M. Bissell
ATTORNEY

May 29, 1962 T. N. LOWRY 3,037,085

ELECTRICALLY CONTROLLED SWITCHING DEVICE

Filed Oct. 22, 1959 3 Sheets-Sheet 3

INVENTOR
T. N. LOWRY
BY Henry M. Bissell
ATTORNEY 3,037,085
Patented May 29, 1962

3,037,085

ELECTRICALLY CONTROLLED SWITCHING DEVICE

Terrell N. Lowry, Boonton, N.J., assignor to Bell Telephone Laboratories, Incorporated, New York, N.Y., a corporation of New York Filed Oct. 22, 1959, Ser. No. 847,918
14 Claims. (Cl. 179—27.54)

This invention relates to electrically controlled switching devices and more particularly to such switches which may be employed in coordinate arrays as in telephone switching networks.

A virtue of magnetically controlled switches resides in the fact that they may be controlled from a remote location. Generally, the controlling magnetic field is electrically produced and is, therefore, controllable by other switches. In telephone communication systems, therefore, it has become the practice to employ a considerable number of such switches in providing the desired interconnections between telephone subscribers. By breaking the paths between subscribers into a number of stages containing the requisite switches, each switch may be employed in a number of different connections at different times. Moreover, where large pluralities of switches are arranged in the various stages, they may be given coordinate designations relating to a matrix array. Accordingly, a particular switch in such an array may be selected by energizing a pair of coordinate leads which individually are shared by a number of other switches. Thus it becomes unnecessary to provide separate control leads for each individual switch.

Switch structures which are particularly applicable to modern switching networks controllable by electronic pulses of very short duration are disclosed in A. Feiner et al. application Serial No. 824,225, filed July 1, 1959 and R. L. Peek, Jr. application Serial No. 847,919, filed October 22, 1959. One advantage of using these structures in a switching network results from their capacity for control by coincident signal selecting arrangements. Such arrangements as are known in the art generally require separate control steps to operate and release the switches involved. Furthermore, most known arrangements rely upon driving such devices with signals which are individually less than some threshold value but which combine in the selected switch to exceed the threshold value and produce the desired operation. These arrangements do not provide positive control of the unselected devices but rely upon their lack of response to signals below the threshold value to maintain them in the unselected condition.

It is, therefore, a general object of this invention to provide an improved switching network for a telephone communication system.

More specifically, it is an object of this invention to simplify the control of a plurality of magnetically responsive switches arranged in a coordinate array.

One object of this invention is to provide a switching matrix in which the control steps of switch closure and release are combined in one operation.

Another object of this invention is to provide a coincident signal controlled switching matrix in which the selection of a particular switch thereof automatically releases other switches sharing the selected control leads.

A further object of this invention is to improve the control of an individual magnetically responsive switch.

It is a particular object of this invention to develop an improved control arrangement for switches of the types disclosed in the above-cited patent applications.

The instant invention comprises a particular coil winding arrangement for magnetically responsive switches which are suitable for inclusion in a matrix array. Further, the invention advantageously provides for the control of an individual magnetically responsive switch on a coincident signal basis, thus providing a simple electromechanical gate with improved operating margins. The invention will be described in terms of its application to the switch structures disclosed in the Feiner et al. and Peek applications referred to hereinabove but it is to be understood that the scope of the invention is not to be limited to such specific structures.

Basically, the embodiments of particular switches employed in my invention and described hereinafter, consist of four coils wound on the two separate magnetic members of a particular switch with two coils being on each member. The two coils on each member are wound in opposite winding sense from each other and have different numbers of turns, one coil advantageously in one embodiment having twice the number of turns of the other coil, e.g., $n$ and $2n$ turns. The coils of the two members are interconnected to form two individual control windings, the $n$-turn coil of each member being arranged in series with the $2n$-turn coil of the other member. The signals applied to the respective control windings are sufficient in amplitude so that the energized $n$-turn coil drives its associated magnetic member to saturation. The serially connected $2n$-turn coil on the other magnetic member will, of course, also drive its associated member to saturation but with a polarity which is opposite to that produced in the magnetic member controlled by the energized $n$-turn coil. As a result, magnetic poles are developed in the respective magnetic members of a polarity which causes the associated switch to open upon the application of a driving signal of either polarity to only one of the two control windings.

If both control windings are energized concurrently by signals of like polarity, the magnetomotive force of each $2n$-turn coil is controlling in determining the magnetic polarity of its associated magnetic member. Thus it can be seen that the concurrent energization of both control windings by pulses of like polarity establishes the magnetization conditions in the respective magnetic members which cause the associated switch to close. It is clear that one application for an individual magnetically responsive switch controlled in accordance with the arrangement of the instant invention is its utilization as an electromechanical AND gate, since the switch closes for concurrent signals of like polarity on its two control windings and opens for any other combination of signals.

It should be emphasized that, while the switch structures described herein as illustrative of my invention are set forth as comprising separate coils of $n$ and $2n$ turns, respectively, on each remanently magnetic member, it is not intended that my invention be limited to structures having such a turns ratio between coils. Structures having other turns ratios of windings may be employed in my invention as well. In general, my invention may be practiced by employing relay winding arrangements of the type described in which the coils have different numbers of turns and in which the windings are energized with sufficient current so that the remanent magnetization states of the corresponding magnetic members are reversed both by the magnetomotive force of the lesser coil individually and by the net magnetomotive force developed when both coils of a particular magnetic member are energized to produce opposing magnetic fields. In other words, my invention encompasses a relay winding arrangement as described in which the coercive force of the remanently magnetic material is exceeded both by the magnetomotive force of any individually energized coil and by the net magnetomotive force of two oppositely energized coils on the same magnetic member.

One specific embodiment of my invention comprises an arrangement for controlling a plurality of magnetically responsive switches arranged in matrix array for concurrent coordinate selection. In this embodiment a plurality of relays of the type described above are arranged in a coordinate array with their respective control windings connected in series by groups to form the various row and column coordinates thus providing a particularly advantageous switching network for a telephone communication system. Concurrent energization of a particular row and column causes the closure of the switch having that coordinate designation while simultaneously effecting the release of all other switches individually associated with the energized row or column. This result follows because the selected switch has both its control windings energized while the other switches in the same row or column have only one control winding energized.

It is a feature of my invention that a relay be controlled by magnetomotive forces of opposite polarity in excess of the magnetomotive force required to produce saturation of the respective magnetic members.

Another feature of my invention is the provision of a pair of relay windings so arranged with respect to a pair of magnetic members that an individual signal on either winding alone produces one relay contact condition while concurrent signals on both windings produce the other contact condition.

A further feature of my invention is the provision of a relay which is both operated and released by control signals of the same polarity.

A still further feature of my invention is the provision for the release of a relay by a control signal of either polarity.

An additional feature of my invention is the provision of a particular winding arrangement for a coordinate array of magnetically responsive switches so that coordinate control pulses which operate a selected switch simultaneously release any other operated switches associated with the pulsed coordinates of the array.

A complete understanding of my invention and of these and other features thereof may be gained from the following description and the accompanying drawing, in which.

Figure 1:
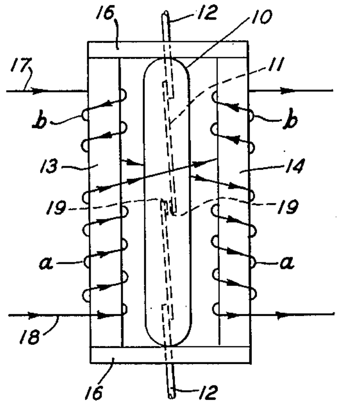
FIG. 1 is a schematic representation of the winding arrangement of one illustrative embodiment of my invention utilizing the relay structure of the above-mentioned Feiner et al. application.

Turning now to the drawing, FIG. 1 depicts a switch structure as disclosed in Feiner et al. patent application Serial No. 824,225, filed July 1, 1959, with its windings arranged in accordance with my invention.

In the figure there is shown a reed switch comprising a glass envelope 10 enclosing a pair of magnetic reeds 11 suspended from respective terminals 12 which extend through opposite ends of the glass envelope. Magnetic members 13 and 14 of a material exhibiting a plurality of stable remanent magnetization states are arranged parallel to the reed switch. Magnetically permeable members 16 at the opposite ends of the members 13 and 14 complete the magnetic circuit and support the associated reed switch. When the magnetic polarities of the members 13 and 14 are in the same direction, that is, either both upward or both downward, magnetic flux is driven through the reeds 11, exerting a force of attraction between them to close the contacts 19 at their free ends. Conversely, when the respective magnetization conditions of the members 13 and 14 are of opposite polarity, that is, one directed upward and one downward, the magnetic flux circulates around the magnetic circuit external to the reed switch and insufficient flux is maintained in the reeds 11 to hold the contacts 19 closed, thus permitting their release.

Associated windings 17 and 18 are shown each comprising individual coils on the respective magnetic members 13 and 14. Each of the windings 17 and 18 has one coil *a* containing twice the number of turns of the other coil *b*. The winding sense of the various coils *a* and *b* of the windings 17 and 18 is such that opposite magnetization polarities are established in the magnetic members 13 and 14 when only one of the windings 17 and 18 is energized. However, if both of the windings 17 and 18 are energized simultaneously by pulses of like polarity, the magnetization states of the magnetic members 13 and 14 are established in the same direction because the magnetomotive force of the larger coil *a* overcomes that of the smaller coil *b* and becomes controlling in determining the magnetization state of the associated magnetic member. Thus it can be seen that the switch contacts 19 will be opened by an individual pulse of either polarity on either of the windings 17 and 18 but will be closed by concurrent pulses of like polarity on both of the windings 17 and 18. The arrows are shown in FIG. 1 merely to clarify the relative directions of the various coils and are not intended to restrict the direction of current to that shown.

Figure 2:
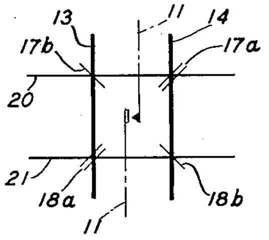
FIG. 2 is one form of schematic representation of the specific embodiment of my invention depicted in FIG. 1.

FIG. 2 is a schematic representation of the embodiment of FIG. 1 of my invention, though the schematic therein depicted is equally valid for the relay structure depicted in FIG. 4 and described below. This schematic representation employs mirror symbols as described in an article by M. Karnaugh entitled "Pulse-Switching Circuits Using Magnetic Cores," vol. 43, Proceedings of the I.R.E., No. 5, page 570. The windings 17*a*, 17*b*, 18*a*, and 18*b*, are depicted by mirror symbols on the remanent legs 13 and 14; as can be seen the relative numbers of turns of the coils *a* and *b* are also depicted. The horizontal lines 20 and 21, in accordance with the mirror symbol conventions, represent the lead wires supplying the control pulses to the windings 17 and 18.

Figure 3:
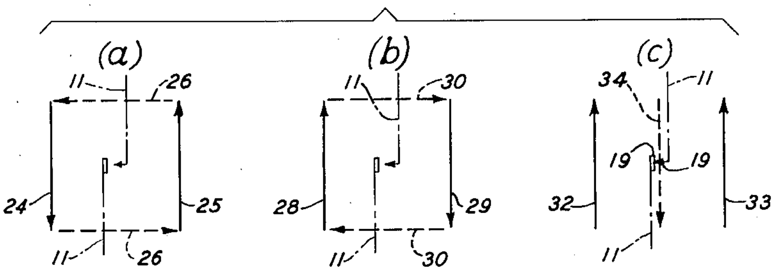
FIG. 3 depicts magnet flux patterns for the operate and release states of the embodiment of FIG. 1.
Figure 5:
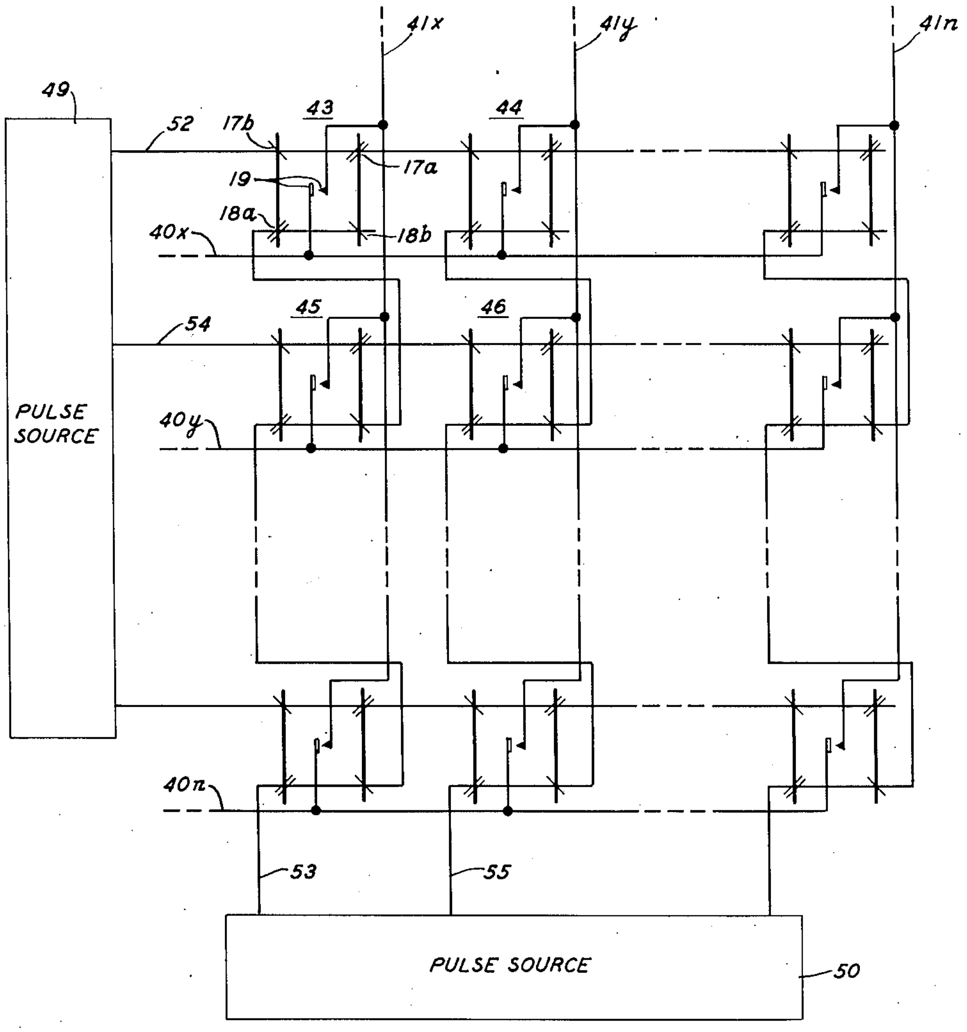
FIG. 5 is a schematic representation of a switching matrix in accordance with my invention.
Figure 6:
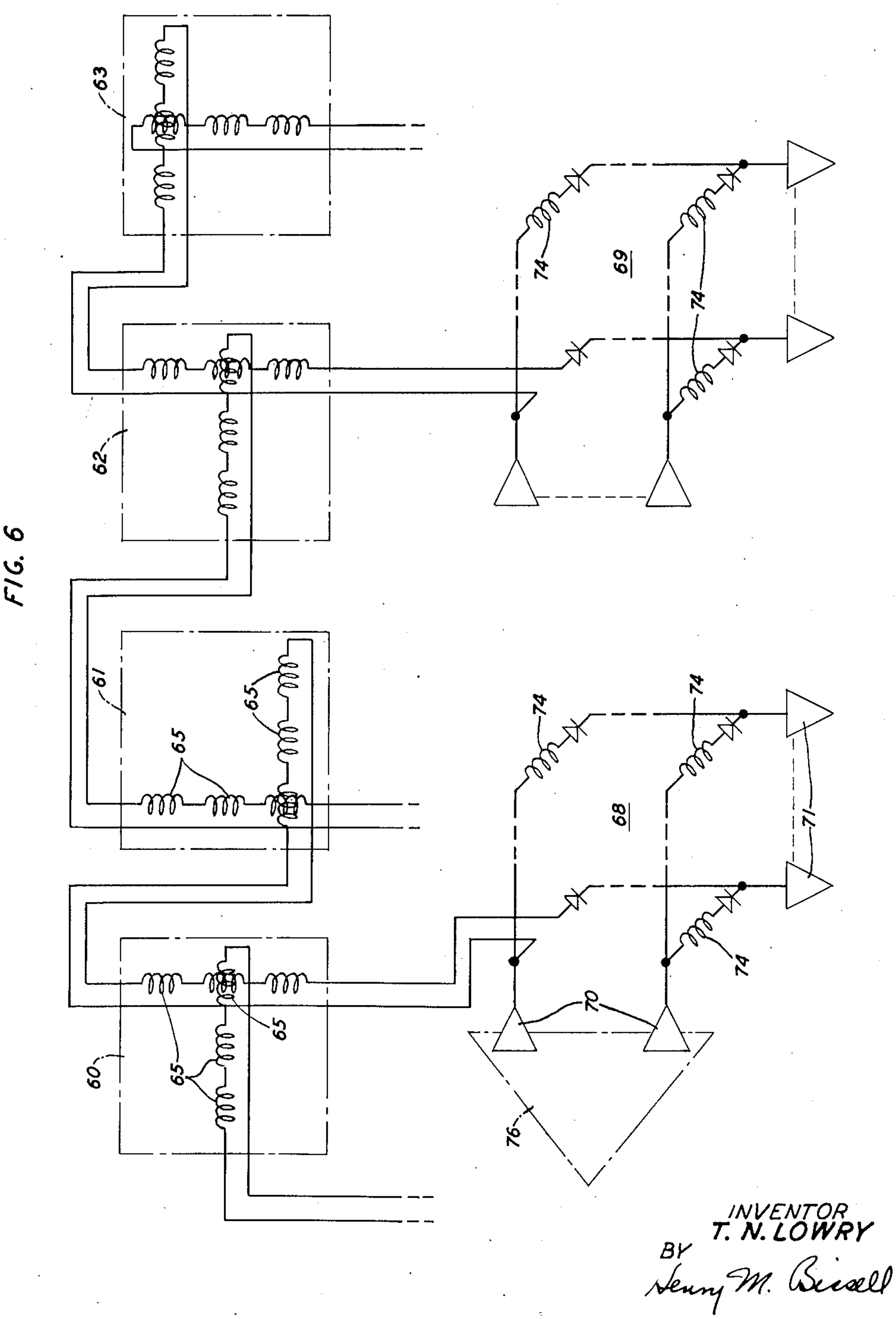
FIG. 6 is a schematic representation of a portion of a telephone switching network in accordance with my invention.

In accordance with an aspect of my invention, sufficient magnetomotive force is developed by either the *a* or *b* coil alone to switch the magnetic state of its associated leg, while the ratio of turns is such that if both the *a* and *b* coils on a leg are pulsed, the state of the leg will switch in accordance with the *b* coil. The various magnetic states that may be present in a switch in accordance with my invention are depicted in FIG. 3, assuming that the switch is included in a matrix, as shown in FIGS. 5 and 6 and discussed below, to which only positive pulses are applied.

If a positive pulse is applied only to winding 17, i.e., to lead 20 in FIG. 2, coil 17*b* sets the magnetic state of leg 13 in a downward direction, as depicted by the arrow 24 in FIG. 3*a*, while coil 17*a* sets the magnetic state of leg 14 in an upward direction as depicted by the arrow 25; dashed arrows 26 show the completion of the flux path through the end members 16. As can be seen no flux links the reeds 11 and the relay is in a released state on application of a single pulse to lead 20 and winding 17.

Similarly, as seen in FIG. 3*b* application of a positive pulse only to lead 21 and thus to winding 18 results in a released state, arrows 28 and 29 depicting the magnetic states of legs 13 and 14, respectively and dashed arrows 30 showing the path for the magnetic flux.

However, when simultaneous positive pulses are applied to the windings 17 and 18, the *b* windings, in accordance with an aspect of my invention, determine the magnetic state of the remanent portions of the switch; accordingly, the resultant diagram is as depicted in FIG. 3c, where arrows 32 and 33 depict the magnetic states of legs 13 and 14, respectively and dashed arrow 34 shows the completion of the flux path through the reeds 11, causing closure of the contacts 19. Accordingly pulsing of either input control lead will cause release of the switch, while pulsing of both input control leads is requisite for closure of the switch. It is to be understood, of course, that negative input pulses would merely reverse the direction of the arrows in each of these diagrams.

Figure 4:
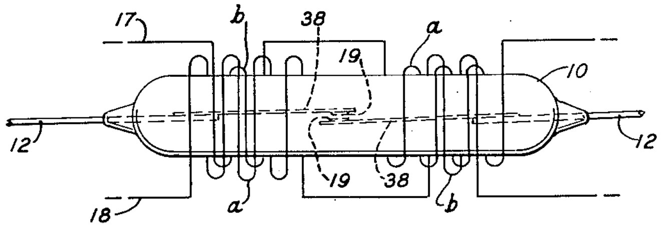
FIG. 4 is a schematic representation of the winding arrangement of another illustrative embodiment of my invention utilizing the relay structure of the above-mentioned Peek application.

Turning now to FIG. 4 there is depicted another specific embodiment of my invention utilizing the relay structure of R. L. Peek, Jr. patent application Serial No. 847,919, filed October 22, 1959. In FIG. 4 elements identical to those shown in FIG. 1 have been identified by the same reference numeral. As seen in FIG. 4 a glass envelope 10 is shown having terminals 12 extending through opposite ends thereof. Suspended from the terminals 12 are two reeds 38 of a material exhibiting a plurality of stable remanent magnetization states. Each reed is itself surrounded by an *a* and a *b* coil of the windings 17 or 18, the *a* and *b* coils of the same winding having disparate numbers of turns, as 2-to-1, and being arranged in the opposite sense.

The operation of this embodiment is similar to that of the embodiment of FIG. 1 and the schematic of FIG. 2 and the diagrams of FIG. 3 are equally applicable. When the windings 17 and 18 are energized to control the reeds 38 in accordance with my invention, each *b* coil develops a magnetomotive force sufficient to drive its associated reed 38 to magnetic saturation in one direction while the associated *a* coil develops a magnetomotive force of twice the magnitude in the opposite direction. A pulse on either winding alone, therefore, drives both reeds 38 into magnetic saturation with opposite polarity thus causing the contacts 19 attached to the free ends of the reeds 38 to assume the open circuit condition. This action is independent of the polarity of the driving pulse since like magnetic poles are thus produced at the free ends of the reeds 38 in either case. If, however, pulses of the same polarity are applied concurrently to both of the windings 17 and 18, the magnetomotive force of the *a* coil will overcome the opposing magnetomotive force of the associated *b* coil about each reed 38 and will determine the magnetization of the corresponding reed 38. The resulting remanent magnetizations of the respective reeds 38 establish opposite magnetic poles at the free ends of the reeds 38 and effect closure of the switch contacts 19. It is clear, therefore, that the switch is closed only by the concurrent application of similar polarity pulses to the corresponding ends of the windings 17 and 18. Any combination of nonconcurrent pulses results in the opening of the switch contacts.

A matrix of switches in accordance with my invention is depicted in FIG. 5 wherein the schematic symbolism of FIG. 2 is employed. In this matrix it is desired to connect any of horizontal conductors 40*x*, 40*y* . . . 40*n* to any one of the vertical conductors 41*x*, 41*y* . . . 41*n*, there being only one such connection to any particular horizontal or vertical conductor at one time. To effect these interconnections a coordinate array of switches 43, 44, 45, 46, et cetera, is employed having coils 17*a*, 17*b*, 18*a*, and 18*b* which are pulsed by positive pulses from pulse sources 49 and 50 to which appropriate address information has been supplied.

When address drive pulses are applied on input leads 52 and 53 the contacts 19 of relay 43 will close. Now if positive drive pulses are applied on coordinate leads 54 and 55, relay 46 will also be operated. When subsequently, the connections through relay 43 between leads 40*x* and 41*x* and through relay 46 between leads 40*y* and 41*y* are no longer required and it is desired to establish a connection between leads 40*y* and 41*x*, control leads 53 and 54 are pulsed.

Pulsing control lead 53 applies a single positive pulse to coils 18*a* and 18*b* of relay 43 which, in the absence of a coincident pulse on control lead 52 to winding 17, effects release of relay 43. Similarly pulsing control lead 54 effects release of relay 46. Relay 45, however, is operated, as coincident pulses are applied to all of its *a* and *b* coils.

This operation illustrates one characteristic of devices in accordance with my invention, namely, that unconditional release of the switch is effected when the switch is subjected to a single excitation current applied to either winding 17 or 18, as contrasted with operation, or contact closure, when the switch is exposed to simultaneous excitation currents. This operation also illustrates an automatic release operating technique which may advantageously be employed with arrays of switches in accordance with my invention. As discussed above, after the second operation, relays 43 and 46 were both operated, representing two independent connections in a coordinate switching array. When these connections are no longer in use, they need not be released by separate operations; instead the next selection which would have produced a conflicting connection, in this instance closure of relay 45, releases them automatically while effecting closure of the subsequently operating relay.

Accordingly, a switching matrix in accordance with my invention permits the elimination of a separate step in the process of releasing a connection, since the release of a connection no longer required takes place as the desired connections are established.

Turning now to FIG. 6, there is depicted one application of the control arrangement for switches in accordance with my invention to a multistage switching network such as the type used in large scale automatic telephone switching systems. Four stages of switching are depicted by the blocks 60, 61, 62, and 63. In each block only the control connections are depicted and these only for selection of one relay in each stage. Each coil symbol 65 represents a control winding 17 or 18, including both the *a* and *b* portions thereof.

As shown, a vertical winding group in one stage of the multistage switching network is connected in series with the control windings of a horizontal winding group in the succeeding stage of the network. While the associated transmission paths are not depicted in the drawing, it is to be understood that they are as depicted in FIG. 5 and further that the associated transmission path conforms to the same interconnection pattern as that of the control windings.

Selection matrices 68, 69, et cetera, are connected to the winding groups described above. Within each matrix, a particular horizontal amplifier 70 applies voltage to a plurality of winding groups; simultaneously a particular vertical amplifier 71 applies a ground connection for a separate, orthogonal plurality of winding groups. Within the winding group which is a member of both the pluralities mentioned above, current will flow to excite the associated relays along the switch vertical and switch horizontal which have been connected in series. In the diode selection matrices 68, 69, each coil symbol 74 is to be understood as representing a series combination of vertical and horizontal winding groups, similar to those depicted in the stages of the switching network.

When similar connections are coincidentally effected in all the switching stages 60, 61, 62, and 63, those relays, one in each stage, which encounter coincident exciting currents operate to complete a transmission path topologically identical with the excited control path; all other relays which lie along the control path and therefore represent possible interfering transmission paths are automatically released, in accordance with my invention as further described above.

Selection of the horizontal and vertical pluralities of winding groups within the diode selection matrices 68, 69, et cetera, may be accomplished typically by means of semiconductor tree selectors 76, only one of which is depicted and which operate on a coincident impedance basis. The operation of the specified relay crosspoints may then be regarded as the result of three coordinate processes: selection by cooperation of currents on the windings 17 and 18 in the relay switching array, of voltages in the diode selection matrices, and of low impedances in the semiconductor trees.

I have found that when relay switches including remanent magnetic elements, of the types discussed herein, are controlled in accordance with my invention, the control characteristics of the relay switch are largely unaffected by the squareness of the hysteresis loop or by variations, for thermal or other reasons, in the magnetic characteristics of the remanent members employed. Further I have found that such relay switches in a coincident array in accordance with my invention have operating margins unaffected by transient motion of the reeds, so that no degradation of the control margins is experienced due to the mechanical vibration of the reeds after release.

Further, margins may be improved by the use of saturating drive currents which must be larger than a certain minimum but which may be as large as desired. Above this minimum value, drive currents must be approximately equal to each other but need not be equal to any arbitrary reference value.

It is to be understood that the above-described arrangements are illustrative of the principles of my invention. Numerous other arrangements may be devised by those skilled in the art without departing from the spirit and scope of the invention.

What is claimed is:

1. A coordinate control switching array comprising a plurality of magnetically responsive switches, each including two magnetic members of a material exhibiting a plurality of stable remanent magnetization states, electromagnetic field producing means individually associated with each of said switches and comprising a pair of coils of opposite winding sense and disparate number of turns surrounding each of said magnetic members, the lesser coil of each magnetic member of each switch being connected in series with the greater coil of the other magnetic member of said switch, means connecting respective ones of said electromagnetic field producing means in series by rows and columns, and means for applying concurrent signals to a particular row and a particular column to operate the switch corresponding to the said particular row and column while simultaneously releasing any other priorly operated switches connected in either said particular row or said particular column.

2. A coordinate control switching array in accordance with claim 1 wherein the number of turns of each of said coils oppositely wound on each of said magnetic members is such as to produce a net magnetomotive force in excess of the coercive force of said material when said pair of coils of one magnetic member are energized and to produce a magnetomotive force in excess of said coercive force when either one of said pair of coils is energized separately.

3. A coordinate control switching array in accordance with claim 2 wherein said greater coil has twice the number of turns of said lesser coil.

4. An electrical switching device comprising a pair of magnetic members, first and second coils about each of said magnetic members, said first coil having a different number of turns than said second coil, means connecting said first coil of each magnetic member in series with said second coil of the other magnetic member so that current in either of the serially connected pairs of coils establishes a particular magnetic flux direction in one magnetic member and the opposite magnetic flux direction in the other magnetic member, and means for applying signals to either or both of said coil pairs to produce release or closure, respectively, of said switch.

5. An electrical switching device in accordance with claim 4 wherein said magnetic members comprise a material exhibiting a plurality of stable remanent magnetization states.

6. An electrical switching device in accordance with claim 5 further comprising a pair of contact members and magnetically permeable means connecting said magnetic members to said contact members for completing the magnetic circuit thereof.

7. A magnetically responsive switching device having a pair of contacts and two separate saturable magnetic members, first and second coils of opposite winding sense on each of said members for controlling magnetic flux therein, said second coil having a greater number of turns than said first coil, means connecting the first coil of each said magnetic member in series with the second coil of the other magnetic member, and means for applying a pulse of either polarity to either but not both of said serially connected pairs of coils to open said contacts and for applying concurrent pulses of like polarity to both of said serially connected pairs of coils to close said contacts.

8. A magnetically responsive switching device in accordance with claim 7 wherein said saturable magnetic members comprise a material exhibiting a plurality of stable remanent magnetization states, the number of turns of said coils on said members being such that the magnetic state of said members is switched on application of a pulse to one of said coils and also to both of said coils on said members.

9. A magnetically responsive switching device in accordance with claim 8 further comprising contact suspension members of a non-remanent magnetic material, a hermetically sealed glass envelope enclosing said contact suspension members, terminals connected to said contact suspension members and extending through said glass envelope, and magnetically permeable means connecting said saturable magnetic members to said terminals outside said glass envelope.

10. A magnetically responsive switching device in accordance with claim 8 further comprising a hermetically sealed glass envelope enclosing said saturable magnetic members and a pair of terminals connected to said saturable magnetic members and extending through said glass envelope for positioning said members in overlapping relationship at corresponding portions thereof.

11. A plurality of magnetically responsive switches arranged in matrix array, each of said switches having a pair of remanently magnetic members with first and second coils individually wound on each of said remanently magnetic members, said second coil having twice the number of turns of said first coil, means connecting each first coil of one remanent magnetic member with the second coil of the other remanent magnetic member of each switch so that the individual electromagnetic fields produced by said first and second coils on each remanent magnetic member are of opposite polarity, and means for closing selected ones of said switches and simultaneously opening others of said switches comprising means connecting said coils in coordinate rows and columns and means for applying concurrent pulses to selected ones of said rows and columns.

12. A switching network comprising a plurality of magnetically responsive switches; each of said switches having a pair of remanently magnetic members, a first coil on each of said remanent magnetic members, and a second coil on each of said remanent magnetic members having twice the number of turns of said first coil; means for applying concurrent pulses to selected pluralities of said switch coils; and means for closing that switch having pulses on all of its coils and for opening those switches having pulses on some but not all of their coils comprising means for connecting said first coil of one remanently magnetic member in series with said second coil of the other remanently magnetic member of the same switch so that the coils on each remanently magnetic member develop opposing magnetomotive forces in response to said pulses.

13. A magnetic switch device comprising a pair of contacts, a pair of magnetic members of a material exhibiting stable states of magnetic remanence, a pair of control windings each having a first coil around one of said members and a second coil around the other of said members and in series with said first coil, each of said members having a first and a second coil therearound, and means for applying control pulses to said control windings, said first and second coils being wound on each member to produce opposing magnetomotive forces therein of different values whereby the magnetic state of a member is switched by a control pulse to either or both of said coils on said member, pulses to both of said control windings producing magnetic states in said members to cause flux through said contacts to effect closure of said contacts and a pulse to only one of said control windings producing magnetic states in said members to remove said flux from said contacts to effect release of said contacts.

14. A magnetic switch comprising a pair of contacts, a pair of magnetic members of a material exhibiting stable states of magnetic remanence, a control winding on each of said members for establishing a first remanent state in each of said members for effecting closure of said contacts on energization of both said control windings, and additional winding means on said magnetic members for establishing a second remanent state in one of said members on establishment of said first remanent state in only the other of said members to effect release of said contacts, said additional winding means on each magnetic member being serially connected to the control winding on the other said member.

References Cited in the file of this patent

UNITED STATES PATENTS 2,187,115 Ellwood et al. ---------- Jan. 16, 1940